Patented Apr. 9, 1935

1,997,337

UNITED STATES PATENT OFFICE 1,997,337

CELLULOSE HIGHER ACYL RADICAL LACQUERS

Carl J. Malm, Rochester, N. Y., and Charles E. Waring, Dayton, Ohio, assignors to Eastman Kodak Company, Rochester, N. Y., a corporation of New York No Drawing. Application December 11, 1930
Serial No. 501,662

5 Claims. (Cl. 134—79)

This invention relates to lacquers comprising cellulose esters having one or more higher acyl radicals and a liquid which during the application of the lacquer is a solvent therefor.

The most commonly used cellulose derivatives at the present time are the nitrates and the acetates. Lacquers containing these cellulose compounds, however, at times do not stick well to the surface but peel readily. An additional disadvantage of cellulose nitrate is its inflammability.

We have now found that certain cellulose esters containing one or more higher acyl radicals such as, for instance, cellulose acetate stearate, are very suitable for the manufacture of lacquers with exceptional sticking properties. These compounds also lack the danger of inflammability which is characteristic of cellulose nitrate.

It is necessary in using these compounds in lacquers that they be dissolved in a solvent from which the cellulose derivative jells before all of the solvent evaporates. This can be accomplished in three ways, namely, (1) using a liquid which dissolves the ester when it is warm but from which the ester jells when the solution cools. (2) Dipping the cold metal article to be coated into the solution described in (1) and, (3) using a liquid together with a low boiling solvent as a vehicle for the ester, which by evaporation of the solvent, but before evaporation of the liquid, causes the ester to jell.

An example of this lacquer and its application is as follows: Fully esterified cellulose acetate-stearate, containing about 30% stearyl is dissolved in toluene at approximately 100° C. The solution is applied to a metal surface by spraying, brushing or the like at about room temperature. Due to the cooling action of the metal upon the lacquer, the solution jells when applied and after drying, the surface is found to be coated with a layer of cellulose acetate-stearate which adheres tenaciously to the metal.

Instead of applying the hot toluene solution of the higher acyl radical ester of cellulose to the cold metal surface, the cold article to be coated may be immersed in the hot toluene solution of the ester whereupon due to the cold temperature of the article the coating of the toluene-ester solution jells upon the surface of the article. Upon immediate removal of the article from the solution there will be no running of the coating. The toluene will evaporate leaving a tenaciously adhering coating of the higher acyl ester upon the article.

Instead of dissolving the ester in hot toluene and applying that solution, the toluene may be mixed with acetone and the cellulose derivative dissolved therein. Upon coating of the surface with this solution, the acetone evaporates first, leaving a jell of cellulose derivative and toluene; upon evaporation of the toluene, a permanent coating remains.

Contrasted to our invention, if these esters are applied in the regular way with a highly volatile material in the solvent, surface coatings are obtained which do not have these exceptional sticking properties.

It will thus be observed that we have discovered that cellulose esters containing a higher acyl radical will be found to adhere tenaciously to metal by coating a solution thereof on the metal in such a way that the solution jells rapidly upon contacting with the metal. In other words, we place the cellulose higher acyl ester in solution in a liquid or mixture of liquids which causes the ester to jell at ordinary temperatures. This liquid which at ordinary temperatures causes the ester to jell may well be termed a "jelling agent." In the above examples we have described toluene as the jelling agent, but it will be understood that others may be employed such as benzol, xylol, and the like, it being only necessary that the jelling agent employed be a non-solvent under the conditions indicated for the particular cellulose ester used.

Numerous single cellulose esters may be employed such, for instance, as cellulose propionate, butyrate, laurate, palmitate, stearate, and the like, or we may employ mixed esters such as cellulose acetate-stearate, cellulose propionate-laurate cellulose-crotonate-stearate, and the like.

Obviously various addition agents, gums, plasticizers, etc., may be added to the foregoing solutions in compounding the desired lacquer, but as these are well known in the art their discussion is not necessary except to say that those employed must be compatible with the higher acyl ester solution.

Although it will be apparent that our invention may be used in coating various objects including those of a metallic nature, it is especially valuable for coating metals which are to be flexed such as sheet metal, wire net, electrical wires, etc.

The method of making the cellulose higher acyl radical compound is already known in the art, for instance, see U. S. Patent Number 1,704,282 to Clarke and Malm. The use of any of the esters described therein, as well as others indicated above, is contemplated by the present invention.

What we claim as our invention and desire to be secured by Letters Patent of the United States is:

1. A lacquer comprising a cellulose acylate which is insoluble in toluene at ordinary temperatures dissolved in an organic solvent essentially consisting of toluene and acetone.

2. A lacquer comprising a mixed cellulose acylate which is insoluble in toluene at ordinary temperatures dissolved in an organic solvent essentially consisting of toluene and acetone.

3. A lacquer comprising a cellulose acetate stearate which is insoluble in toluene at ordinary temperatures in an organic solvent essentially consisting of toluene and acetone.

4. A process of lacquering, which comprises applying a hot toluene solution of a cellulose acetate stearate, which is insoluble in toluene at ordinary temperatures, to the surface to be protected.

5. A process of lacquering which comprises applying a hot toluene solution of a cellulose ester containing higher acyl groups, which ester is insoluble in toluene at ordinary temperatures, to the surface to be protected.

CARL J. MALM.
CHARLES E. WARING.